United States Patent [19]

Flynn

[11] Patent Number: 4,695,424

[45] Date of Patent: Sep. 22, 1987

[54] CELL FOR A SPENT NUCLEAR FUEL RACK

[75] Inventor: William M. Flynn, Pensacola, Fla.

[73] Assignee: Westinghouse Electric Corp., Pittsburgh, Pa.

[21] Appl. No.: 790,684

[22] Filed: Oct. 23, 1985

[51] Int. Cl.$^4$ ............................................. G21C 19/40
[52] U.S. Cl. .................................................. 376/272
[58] Field of Search ..................... 376/272; 250/506.1, 250/507.1

[56] References Cited

U.S. PATENT DOCUMENTS

| 4,006,362 | 2/1977 | Mollon et al. | 376/272 |
| 4,034,227 | 7/1977 | Soot | 376/272 |
| 4,039,842 | 8/1977 | Mollon | 376/272 |
| 4,088,897 | 5/1978 | Soot | 376/272 |
| 4,119,859 | 10/1978 | Karzmar et al. | 250/507 |
| 4,143,276 | 3/1979 | Mollon | 376/272 |
| 4,143,277 | 3/1979 | Krieger | 376/272 |
| 4,177,385 | 12/1979 | Bevilacqua | 376/272 |
| 4,243,889 | 1/1981 | Weber | 376/272 |
| 4,248,668 | 2/1981 | Dixon et al. | 376/272 |
| 4,305,787 | 12/1981 | Rivacoba | 376/272 |
| 4,319,960 | 3/1982 | Larson et al. | 376/272 |
| 4,342,620 | 8/1982 | Vickrey | 376/272 |
| 4,366,115 | 12/1982 | Schlumpf | 376/272 |

Primary Examiner—Deborah L. Kyle
Assistant Examiner—Daniel Wasil
Attorney, Agent, or Firm—Daniel C. Abeles

[57] ABSTRACT

A cell for a spent fuel rack includes a sheet metal element that is bent to provide four flat wall portions. The wall portions are joined at bent regions which provide protruding corners between three of the wall portions, the protruding corners having a short radius of curvature. A rod is welded at the fourth corner of the cell, preferably at the time the cell is manufactured. A sheet of neutron poison is affixed to each wall portion by a wrapper. The protruding cell cornersd and pre-installed rod facilitate fabrication the spent fuel rack by permitting cells to be welded directly together. The protruding corners may extend for substantially the entire height of the cell, or they may have segments which are spaced apart. The bent regions may also include flat platform portions which simplify the constsruction of the wrappers.

8 Claims, 8 Drawing Figures

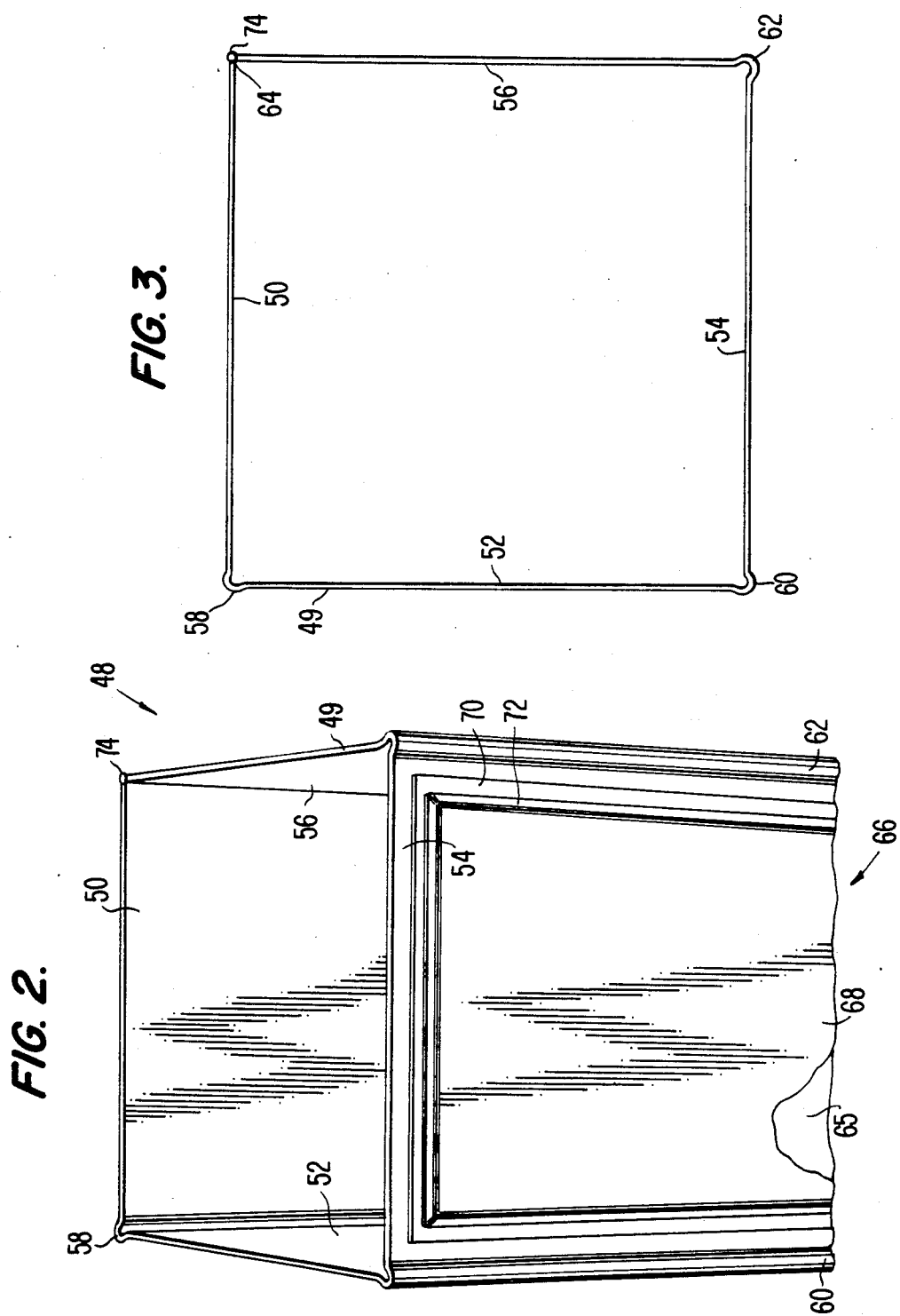

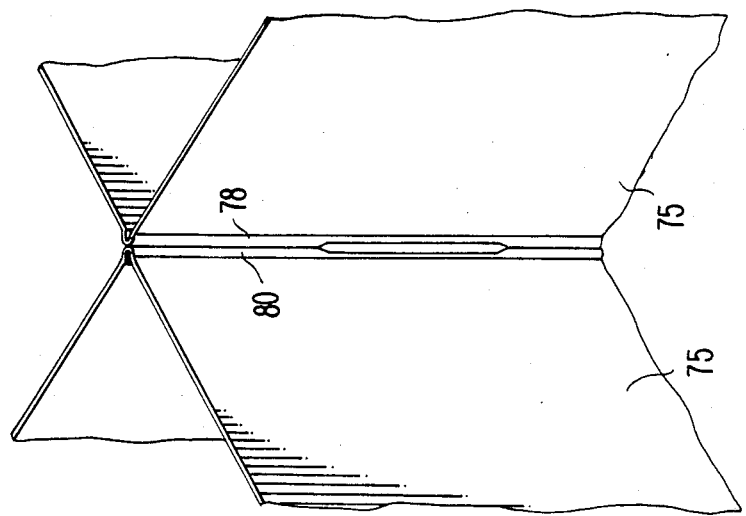
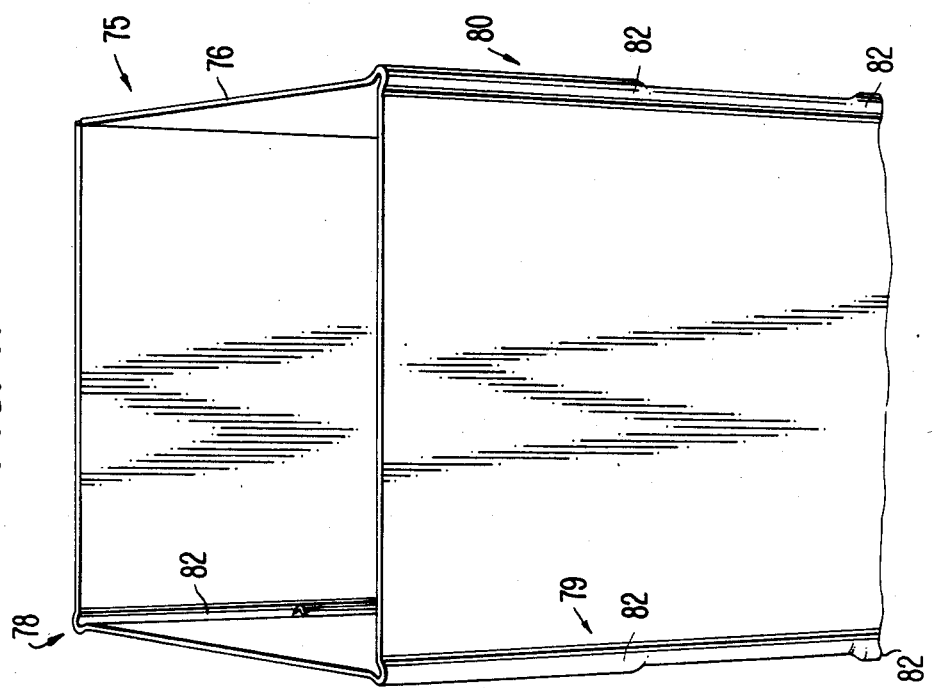

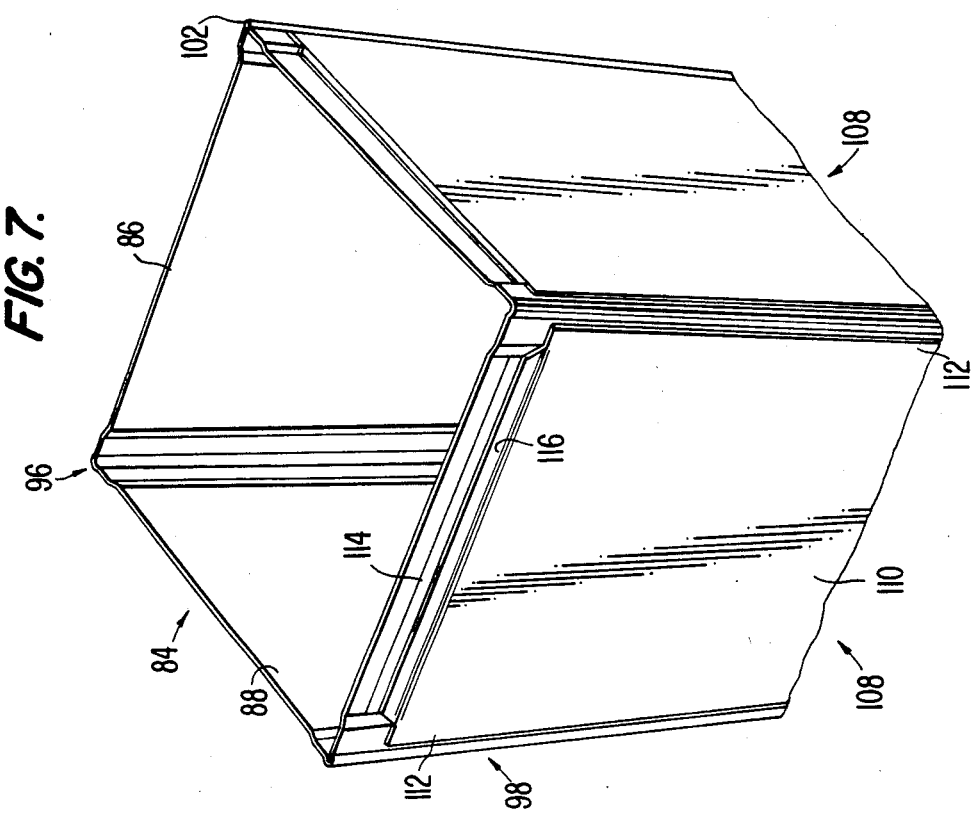
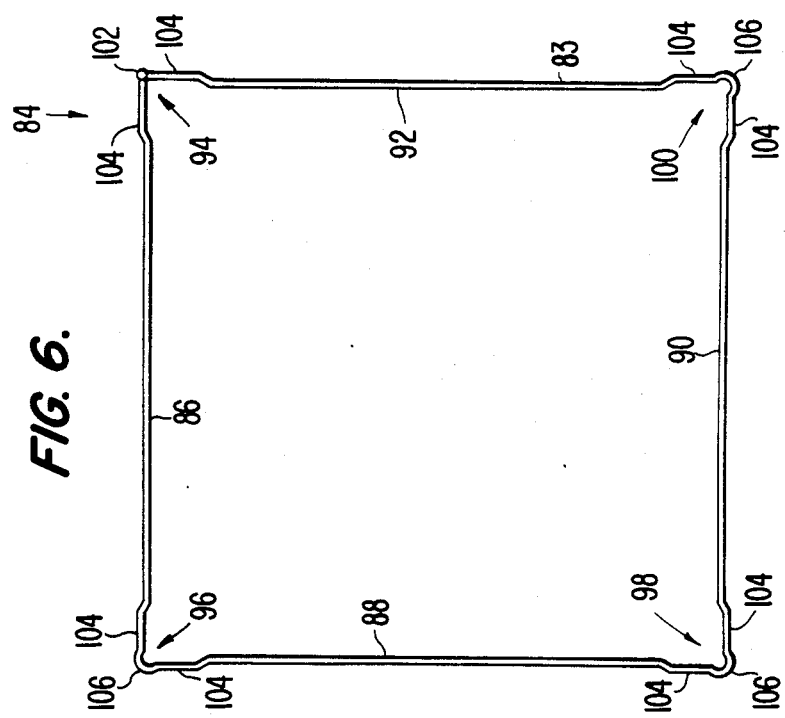

CELL FOR A SPENT NUCLEAR FUEL RACK

BACKGROUND OF THE INVENTION

The present invention is related to cells in a rack for receiving fuel assemblies, and more particularly to cells having protruding corners which facilitate construction of the rack.

Nuclear fuel is supplied to both pressurized water reactors and boiling water reactors in the form of elongated fuel assemblies. A fuel assembly comprises a bundle of fuel rods formed by filling hollow cylinders with pellets of fissionable fuel enriched with U-235, together with control rods and other structures. Fuel assemblies are commercially available in various dimensions; a typical fuel assembly for a boiling water reactor has a length of 175 inches (4.45 meters), a square cross-section of 30¼ square inches (195 square centimeters), and a mass of 600 pounds (270 kilograms).

After a service life of several years in a reactor, the U-235 enrichment of a fuel assembly is depleted. Furthermore, a variety of fission products, having various half-lives, are present in the fuel rods. These fission products generate intense radioactivity and heat when the fuel assemblies are removed from the reactor, and accordingly the fuel assemblies removed for short-term storage to a spent fuel rack that is submerged in a pool containing boron salts dissolved in water. Although this rack is deemed a "spent fuel" rack, it may also be used to temporarily store fuel assemblies which have a remaining service life and which will be returned to the reactor. Because of this, the rack should offer lateral support to the fuel assemblies so that their weight does not distort them and make return to the reactor impossible.

FIG. 1A illustrates a conventional spent fuel rack 20 for holding the typical BWR fuel assemblies mentioned above. Although only a corner of rack 20 is illustrated, the rack provides a checkerboard array of 10×10 storage slots for receiving one hundred fuel assemblies. Rack 20 includes a stainless steel base plate 22 having one hundred holes 24 in it to permit circulation of water. Fifty cells (of which only cells 26, 28, and 30 are illustrated) are affixed to plate 22 and are joined to each other, in a manner to be described, so that fifty of the storage slots are provided within the fifty cells. The remaining fifty storage slots are provided between the walls of four adjacent cells and will be deemed "free" storage slots to distinguish them from a storage slot within a cell. Since four adjacent cells are not available at the periphery of plate 22, the "free" storage slots in this region are completed by panels that are connected to base 22 and a pair of peripheral cells. For example, in FIG. 1A panel 32 is welded to cells 26 and 30 and to plate 22 to complete the "free" storage slot bounded by cells 26–30.

The construction of a conventional cell will be described with reference to FIG. 1B, wherein cell 28, for example, is an elongated hollow structure having four stainless steel walls 34. A sheet of neutron poison 36, such as boron carbide, is disposed on each wall and retained in place by a stainless steel wrapper 38, which is welded to the wall 34. Neutron poison sheets 36 are present to prevent criticality by isolating the fuel assemblies housed in rack 20. At the four corners of cell 28, the walls 34 may be joined by butt-welding, as at 40, or by bent portions (the same as bent portion 42 of cell 26).

The dimensions of the hundred storage slots provided by rack 20 must match those of the particular fuel assemblies which are to be stored, so that the fuel assemblies fit snugly within the storage slots and receive lateral support from the sides thereof. The lateral support keeps the fuel assemblies from bowing unduly, which would prevent their return to the reactor. A snug fit is particularly important in view of the possibility of an earthquake, since the lateral support provided by the cells must keep the stored fuel assemblies from rattling around unduly during a seismic disturbance. For the typical fuel assemblies mentioned above the cells are 172 inches (437 cm) high and have inside dimensions of 6.025 inches (15.30 cm) from one wall 34 to the opposite wall 34. The radius of curvature of portions 42 must be ¼ inch (0.64 cm) or less, and is typically 0.062 inch (0.16 cm) at the inside surface. A short radius of curvature is necessary because fuel assemblies have sharp edges which might be damaged during a seismic event if bent portions 42 of larger radius were used. Moreover the use of a short radius of curvature lessens the risk that a stored fuel assembly might rotate slightly during installation or during a seismic event. Such rotation might cause the fuel assembly to bind with the cell and be difficult or impossible to remove.

If the outer corners of such cells were welded directly together it will be apparent that poison sheets 36 and wrappers 38 would protrude into the space available for the "free" storage slots, making them too small. In order to avoid this problem FIG. 1B illustrates a rod 44 secured between the corners of cells 26 and 28 by welds 46. For the typical fuel assemblies mentioned above this provides a center-to-center spacing of 6.25 inches (15.88 cm) between a storage slot provided within a cell and the nearest "free" storage slots. Like all things mechanical, however, in practice the dimensions of the cells may deviate slightly, and manufacturing tolerances are established.

Rack 20 is constructed from the center outward. Construction starts by inserting a square bottom fixture into a central hole 24, positioning the bottom of a cell using this fixture, inserting another square fixture at the top of the cell to ensure proper orientation with respect to plate 22, welding the bottom of the cell to plate 22, and then removing the fixtures. Square bottom fixtures are then inserted into the holes 24 at the four corners of the just-installed central cell, and four cells are positioned between the bottom fixtures and top fixtures. While the fixtures maintain the cells in their proper positions, technicians weld the bottoms of the cells to plate 22, select rods 44 of the appropriate diameter to bridge the gaps between the corners of the cells, and weld the selected rods 44 to the cells. The fixtures are then removed and work begins on the next ring of cells.

The width of the gap between the corners of adjacent cells before the rods 44 are installed is determined by the dimensional variance of the particular cells. In extreme situations there may be no gap at all and the cells are welded directly together. Moreover, in general a rod need not be welded along the entire height of the cells in order to ensure that rack 20 is sufficiently stable to withstand possible seismic disturbances which may be encountered during use. That is to say, the minimum length of the weld varies depending upon the geology at particular reactor sites. The technicians must measure the lengths of the welds they apply in view of the seismic requirements.

Construction of a spent fuel rack 20 using conventional cells in this manner is cumbersome for several reasons. In addition to the base plate 22 and cells, a supply of rods 44 must be kept on hand during fabrication of the rack. Furthermore the need to select rods and weld them into the gaps between cells significantly increases the work of the technicians who make a rack. The fabrication process is further encumbered because the technicians must measure the lengths of the welds.

SUMMARY OF THE INVENTION

Accordingly, an object of the present invention is to provide a cell which simplifies fabrication of a spent fuel rack by avoiding the problems discussed above.

Another object of the present invention is to provide a cell having protruding corners with a short radius of curvature, the protruding corners making it unnecessary to weld rods between the corners of the cells during manufacture of a spent fuel rack.

Another object of the present invention is to provide cells having corners that protrude at predetermined positions which identify the lengths of the welds required during fabrication of the spent fuel rack.

Another object of the present invention is to provide a cell having protruding corners which avoid the need to weld rods during fabrication of a spent fuel rack, the corners being configured so as to simplify fabrication of the wrappers for the neutron poison sheets.

These and other objects are achieved by providing a four-cornered cell having a sheet metal element that is bent to provide four wall portions, with elongated bent regions at three of the corners between wall portions. Each bent region has at least one protruding portion that has a short radius of curvature and that is intersected by planes lying on the outer surfaces of the adjacent wall portions. In one embodiment the protruding portions extend for substantially the entire height of the cell. In another embodiment the protruding portions extend along spaced-apart segments of the cell corners. In another embodiment the bent regions include platform portions for securing the edges of the wrappers.

BRIEF DESCRIPTION OF THE DRAWINGS

FIG. 2 is a perspective view of a cell in accordance with a first embodiment of the present invention;

FIG. 3 is a top view of the cell of FIG. 2 before the neutron poison sheets and wrappers are applied to the cell walls;

FIG. 4 is a perspective view, partially broken away, illustrating a second embodiment of the cell of the present invention before the neutron poison sheets and wrappers are applied to the cell walls;

FIG. 5 is a perspective view, partially broken away, illustrating a pair of the cells of FIG. 4 (without the neutron poison sheets and wrappers on the cell walls) positioned for welding during fabrication of a spent fuel rack;

FIG. 6 is a top view of a third embodiment of the cell of the present invention, without neutron poison sheets and wrappers on the cell walls; and FIG. 7 is a perspective view, partially broken away, illustrating the cell of FIG. 6 with neutron poison sheets and simplified wrappers on the cell walls.

DESCRIPTION OF THE PREFERRED EMBODIMENTS

Figure 1A:
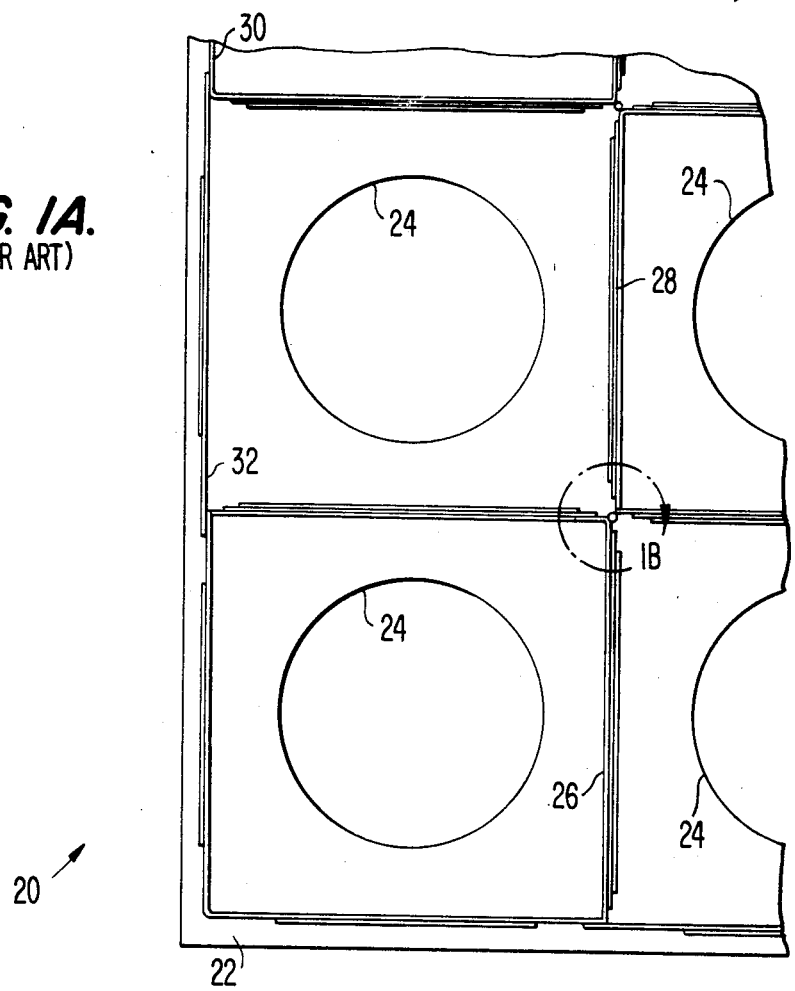
FIG. 1A is a top view, partially broken away, illustrating a spent fuel rack fabricated from conventional cells.
Figure 1B:
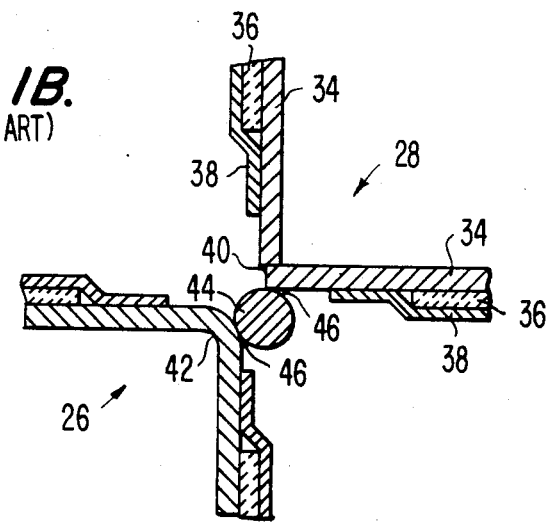
FIG. 1B is a sectional view, taken along the region 1B of FIG. 1A, illustrating a rod welded between the corners of a pair of conventional cells.

Cell 48 in FIGS. 2 and 3 includes a stainless steel sheet metal element 49 that is bent to provide four wall portions 50, 52, 54, and 56, each of wall portions 50–56 having an outer surface that lies substantially in plane. Bent regions 58, 60, and 62, which provide three of the corners of cell 48, protrude beyond planes lying on the outer surfaces of the adjacent wall portions 50–56. For example, it will be apparent that a plane lying on the outer surface of wall portion 50 intersects bent region 58 and that a plane lying on the outer surface of wall portion 52 also intersects bent region 58. The fourth corner of cell 48 is provided by the abutment of walls 50 and 56, the edges of which are welded at 64. Sheets 65 of neutron poison, such as boron carbide, are secured to wall portions 50–56 by wrappers 66. Each wrapper has a flat central portion 68, a flat border region 70 which is welded to element 49, and a formed region 72 joining the border region 70 and the central portion 68. While the dimensions of cell 48 will vary depending upon the particular fuel assemblies to be stored, typical dimensions are 6.025 inches (15.30 cm) from the inside surface of one wall portion to the inside surface of the opposite wall portion (e.g., wall portion 52 to wall portion 56), with the cell being 172 inches (437 cm) high and the element 49 being 0.075 inches (0.19 cm) thick. The radius of curvature of bent regions 58–62 must be relatively short in order to maximize support for the stored fuel assembly at the corners thereof and in order to retard rotation of the fuel assembly during insertion into the cell or during a seismic event. Such rotation might cause the fuel assembly to become lodged in the cell. In practice the radius of curvature should not be greater than ¼ inch (0.64 cm).

During fabrication of cell 48, a strip of sheet metal is put in a press having a die for forming bent regions 58–62. The sheet metal used must be very malleable, and for this reason stainless steel is preferred. If a brittle metal were employed, such as a boron/stainless steel alloy, the necessary sharp bends could not be attained without cracking the workpiece. Either bent region 58 or bent region 62 is formed during the first press operation, during which the corresponding wall portion 50 or 56 bends upward. That is, during the first press operation the sheet metal workpiece is bent into a L-shaped configuration. The workpiece is then rotated by 180 degrees and the other of bent regions 58 and 62 is formed, whereupon the other of wall portions 56 and 50 is bent upward. After the second press operation the workpiece is generally U-shaped, with the base of the U being twice as long as the upstanding arms of the U. The workpiece is then repositioned on the press to form bent region 60. This third press operation bends the workpiece into substantially its final form, whereupon the edges of wall portions 50 and 56 are butt-welded at 46, and then rod 74 is welded along the intersection. Neutron poison sheets 65 and wrappers 68 are then affixed to the wall portions 50–56 to complete fabrication of cell 48.

It has been found that, during fabrication of a rack 20 (see FIG. 1A), the diameters of the rods 44 needed to bridge the gaps between the corners of conventional cells has consistently (approximately 90% of the time)

been ¼ inch (0.64 cm). The diameter of rod 74 is half that, or ⅛ inch (0.32 cm). Furthermore the outer surfaces of bent regions 58–62 are configured as arcs having a radius of curvature of ⅛ inch (0.32 cm), a figure that is safely less than the quarter-inch (0.64 cm) maximum that is desirable. Bent regions 58–62 need not be configured as circular arcs, since protrusions having other shapes could be used to bridge the cell-to-cell gaps during fabrication of a spent fuel rack, but it has been found that cell corners having protrusions of arcuate shape are easier to form without cracking the sheet metal workpiece. Moreover rounded corner protrusions, such as bent regions 58–62, permit a degree of lateral positioning of the cells 48 when a spent fuel rack is assembled.

Fabrication of a spent fuel rack using cells 48 proceeds substantially as described in the Background portion of this application, except that rods 44 are unnecessary. Instead, the bent regions 58–62 and rod 74 bridge the corner-to-corner gaps that would otherwise exist. Despite slight dimensional variations from cell to cell, a corner of one cell 48 can be welded directly to the corner of an adjacent cell 48 perhaps 90% of the time. During the remaining 10% of the time a rod having a small diameter might be needed, or it might be necessary for technicians to grind the corners (58, 60, 62, 74) of adjacent cells 48. Even considering the small percentage of cases when the technicians assembling a spent fuel rack must adjust the cell dimensions in this manner, the use of cells 48 substantially reduces the work required for making a spent fuel rack.

In the modified embodiment of FIGS. 4 and 5, cell 75 (which is illustrated without its neutron poison sheets and wrappers) includes a sheet metal element 76 having bent regions 78, 79 and 80 which do not protrude for the entire height of the cell. Instead, corner protrusions 82 have predetermined lengths and are spaced apart. Protrusions 82 have a radius of curvature of ⅛ inch (0.32 cm). The lengths of the protrusions 82 and the distance between them are determined by seismic considerations at the site where the spent fuel rack is to be used, and different dies are needed to form the corners of cells 75 that are to be used at sites having significantly different geological activity. The principal advantage of using cells 75 is that technicians can weld the protrusions 82 directly together without having to scale and mark off the areas to be welded.

In the embodiment of FIGS. 6 (which does not illustrate the neutron poison sheets and wrappers on the wall portions) and 7, the sheet metal element 83 of cell 84 has been bent to provide wall portions 86, 88, 90, and 92 of relatively reduced width, compared to the dimensions of the cell, and bent regions 94, 96, 98, and 100. Rod 102 is welded at region 94, where the sheet metal edges are joined. Bent regions 94–100 have platform portions 104 which have outer surfaces that are substantially flat and which extend beyond the outer surfaces of wall portions 86–92. Bent regions 96–100 also have arcuate portions 106, the radius of curvature of which is ⅛ inch (0.33 cm).

With continuing reference to FIGS. 6 and 7, each of wrappers 108 has a flat central portion 110 and lateral border regions 112 that are also flat and lie in the same plane as central region 110. Top border region 114 is joined to central region 110 by formed region 116. Although not illustrated, wrappers 108 are terminated downwardly by bottom border regions and formed regions similar to 114 and 116. It will be apparent that the presence of platform portions 104 facilitates fabrication of wrappers 108 since formed regions (e.g., 116) are needed only at the tops and bottoms of the wrappers; the lateral edges of wrapper 108 need not be formed since regions 112 can be welded directly to platform portions 104.

From the foregoing discussion it will be apparent that the present invention provides several embodiments of cells having bent regions which provide protrusions at the corners of the cells in order to facilitate construction of spent fuel racks. A protrusion may extend continuously along a cell corner, or it may have portions which are spaced apart so that technicians need not scale and mark off the areas that are to be welded. The bent regions may also include flat platform portions so that the sides of wrappers may be attached without being formed.

It will be understood that the above description of the present invention is susceptible to various modifications, changes, and adaptations, and the same are intended to be comprehended within the meaning and range of equivalent of appended claims.

I claim:

1. A cell for a spent fuel rack, comprising:
a sheet metal element having an inside surface and an outside surface, and including
a first substantially flat wall portion,
a second substantially flat wall portion disposed substantially perpendicularly to said first wall portion,
a third substantially flat wall portion disposed substantially perpendicularly to said second wall portion and substantially parallel to said first wall portion,
a fourth substantially flat wall portion disposed substantially perpendicularly to said first and third wall portions and substantially parallel to said second wall portion,
an elongated bent region joining said first and second wall portions, said bent region having an elongated and substantially flat platform portion that is disposed substantially parallel to said first wall portion but that is not coplanar with said first wall portion, an elongated and substantially flat platform portion that is disposed substantially parallel to said second wall portion but that is not coplanar with said second wall portion, and at least one protruding portion that is intersected by planes lying on the outer surfaces of said platform portions of said bent region, the outside surface of said at least one protruding portion of said bent region having a radius of curvature that is less than about 0.65 centimeters,
an additional elongated bent region joining said second and third wall portions, said additional bent region having an elongated and substantially flat platform portion that is disposed substantially parallel to said second wall portion but that is not coplanar with said second wall portion, an elongated and substantially flat platform portion that is disposed substantially parallel to said third wall portion but that is not coplanar with said third wall portion, and at least one protruding portion that is intersected by planes lying on the outer surfaces of said platform portions of said additional bent region, the outside surface of said at least one protruding portion of said additional bent region having a radius of curvature that is less than about 0.65 centimeters, a further elongated bent region joining said third and fourth wall portions, said further elongated bent region having an elongated and substantially flat platform portion that is disposed substantially parallel to said third wall portion but that is not coplanar with said third wall portion, an elongated and substantially flat platform portion that is disposed substantially parallel to said fourth wall portion but that is not coplanar with said fourth wall portion, and at least one protruding portion that is intersected by planes lying on the outer surfaces of said platform portions of said further bent region, the outside surface of said at least one protruding portion of said further bent region having a radius of curvature that is less than about 0.65 centimeters, another elongated and substantially flat platform portion that is disposed substantially parallel to said fourth wall portion but that is not coplanar with said fourth wall portion, and another elongated and substantially flat platform portion that is disposed substantially parallel to said first wall portion but that is not coplanar with said first wall portion;

means for joining said another platform portions;

four sheets of neutron poison; and four sheet metal wrappers, each securing a respective neutron poison sheet to a respective wall portion, each wrapper having a substantially flat central portion and substantially flat border regions that lie in the same plane as the central portion and that are attached to platform portions.

2. The cell of claim 1, wherein said neutron poison sheets comprise boron carbide.

3. The cell of claim 1, wherein said bent region, additional bent region, and further bent region are configured identically, wherein the protruding portions have substantially the same radius of curvature, and wherein said means for joining said first and fourth wall portions comprises a rod that is disposed substantially parallel to said bent regions and that is welded to said first and fourth wall regions, the rod having a diameter that is substantially the same as the radius of curvature of the protruding portions.

4. The cell of claim 1, wherein each of said bent region, additional bent region, and further bent region has a respective protruding portion that is continuous and that extends for substantially the entire length of the bent region.

5. The cell of claim 1, wherein each of said bent region, additional bent region, and further bent region has a plurality of protruding portions that are spaced apart.

6. The cell of claim 1, wherein each said at least one protruding portion has an outer surface with a radius of curvature of about 0.3 centimeters.

7. A spent fuel rack, comprising the cell of claim 1 and a base plate on which said cell is mounted.

8. A spent fuel rack, comprising:

a base plate;

a plurality of cells mounted on the base plate, each of said cells including a sheet metal element having an inside surface and an outside surface and including a first substantially flat wall portion, a second substantially flat wall portion disposed substantially perpendicularly to said first wall portion, a third substantially flat wall portion disposed substantially perpendicularly to said second wall portion and substantially parallel to said first wall portion, a fourth substantially flat wall portion disposed substantially perpendicularly to said first and third wall portions and substantially parallel to said second wall portion, an elongated bent region joining said first and second wall portions, said bent region having an elongated and substantially flat platform portion that is disposed substantially parallel to said first wall portion but that is not coplanar with said first wall portion, an elongated and substantially flat platform portion that is disposed substantially parallel to said second wall portion but that is not coplanar with said second wall portion, and at least one protruding portion that is intersected by planes lying on the outer surfaces of said platform portions of said bent region, the outside surface of said at least one protruding portion of said bent region having a radius of curvature that is less than about 0.65 centimeters, an additional elongated bent region joining said second and third wall portions, said additional bent region having an elongated and substantially flat platform portion that is disposed substantially parallel to said second wall portion but that is not coplanar with said second wall portion, an elongated and substantially flat platform portion that is disposed substantially parallel to said third wall portion but that is not coplanar with said third wall portion, and at least one protruding portion that is intersected by planes lying on the outer surfaces of said platform portions of said additional bent regions, the outside surface of said at least one protruding portion of said additional bent region having a radius of curvature that is less than about 0.65 centimeters, and a further elongated bent region joining said third and fourth wall portions, said further elongated bent region having an elongated and substantially flat platform portion that is disposed substantially parallel to said third wall portion but that is not coplanar with said third wall portion, an elongated and substantially flat platform portion that is disposed substantially parallel to said fourth wall portion but that is not coplanar with said fourth wall portion, and at least one protruding portion that is intersected by planes lying on the outer surfaces of said platform portions of said further bent regions, the outside surface of said at least one protruding portion of said further bent region having a radius of curvature that is less than about 0.65 centimeters, another elongated and substantially flat platform portion that is disposed substantially parallel to said fourth wall portion but that is not coplanar with said fourth wall portion, and another elongated and substantially flat platform portion that is disposed substantially parallel to said first wall portion but that is not coplanar with said first wall portion;
means for joining said another platform portions;
four sheets of neutron poison; and
four sheet metal wrappers, each securing a respective neutron poison sheet to a respective wall portion, each wrapper having a substantially flat central portion and substantially flat border regions that lie in the same plane as the central portion and that are attached to platform portions; and
weld means for joining adjacent cells.

* * * * *